United States Patent [19]

Bell et al.

[11] 4,174,371

[45] Nov. 13, 1979

[54] INTEGRATED SOLAR HEATED RESOURCE TRANSFORMATION SYSTEM

[76] Inventors: William M. Bell, 21 Imrie Rd., Allston, Mass. 02134; David A. Del Porto, 88 Blueberry Hill La., Sudbury, Mass. 01776

[21] Appl. No.: 855,779

[22] Filed: Nov. 29, 1977

[51] Int. Cl.² .......................... C05F 3/04; C05F 3/06; F24J 3/02

[52] U.S. Cl. ........................... 422/109; 4/DIG. 12; 71/12; 126/430; 422/105; 422/111; 422/198; 422/119; 422/184; 422/193

[58] Field of Search ....................... 23/259.1; 71/9, 11, 71/12, 13; 210/15, DIG. 28; 4/DIG. 12

[56] References Cited

U.S. PATENT DOCUMENTS

| | | | |
|---|---|---|---|
| 2,880,074 | 3/1959 | Carmichael | 23/259.1 |
| 3,010,801 | 11/1961 | Schulze | 23/259.1 |
| 3,136,608 | 6/1964 | Lindstrom | 23/259.1 |
| 3,236,605 | 2/1966 | Pierson | 23/259.1 |
| 3,314,765 | 4/1967 | Abson et al. | 23/259.1 |
| 3,853,480 | 12/1974 | Kaelin | 23/259.1 |
| 3,895,916 | 7/1975 | Rosner | 23/259.1 |
| 3,927,985 | 12/1975 | Hyttinge et al. | 23/259.1 |
| 3,946,944 | 3/1976 | Keyes et al. | 126/270 X |
| 4,062,770 | 12/1977 | Kneer | 23/259.1 X |

Primary Examiner—Joseph Scovronek
Attorney, Agent, or Firm—Edward J. Collins

[57] ABSTRACT

A system providing for the temperature and humidity controlled aerobic composting of organic materials is described. The system includes at least one composting chamber, at least one thermal mass, ducts for conveying air from the vicinity of the thermal mass to a composting chamber, at least one solar glazing panel for providing heat to a thermal mass, and an air intake port for providing air in the vicinity of a thermal mass.

23 Claims, 8 Drawing Figures

INTEGRATED SOLAR HEATED RESOURCE TRANSFORMATION SYSTEM

BACKGROUND OF THE INVENTION

The invention described herein relates generally to organic waste treatment systems, and more particularly to an aerobic composting or humus toilet system which uses controlled solar heating coupled with controlled air and moisture flow to accelerate, augment, and render more efficient the composting process, and to transform human excrement, organic kitchen, and/or garden materials into a valuable, nutrient-rich fertilizer and soil conditioner.

Whatever the advantages, there are several significant problems associated with the use of the well-known flush toilet and attendant sewer systems. For example, it is widely thought that such toilets are terribly wasteful of clean water. Typically, five gallons of drinkable water are dumped into the sewer system each time such toilets are flushed. In fact, the average person flushes five times a day, contaminating 9000 gallons of drinking water in a year at a cost of $18–45. All of this is done to process what ends up as 75–100 pounds of humus in a properly operating composting toilet. The usual ratio is approximately 100 parts by volume of clean water mixed with one part of human excrement. The water-excrement mixture is then transported to a central treatment facility where efforts, usually unsuccessful, to separate the two components take place. In other arrangements, the water-excrement mixture passes into cesspools or septic tanks, where the two components are also ultimately to be separated. Contaminated water also leaks out of sewer systems on its way to treatment facilities and even after treatment remains contaminated to some extent. The result is often the pollution of underground water supplies and wells and the contamination of lakes, rivers, coastal regions, and other waterways. There are also major problems associated with the disposal of the sludge that results from the treatment process required by sewer systems and the septage that remains after septic tank treatment. Both systems consume large quantities of clean water. Indeed, the very nature of water-borne waste treatment systems is such that 60–90% of the cost is in the pipes and pumps used to transport the material to the treatment site.

There are many areas that do not conveniently lend themselves to either sewer or septic systems, for example, locations remote from concentrations of population, islands and hilly or mountainous regions where the soil absorption is poor. Various forms of toilets have been used in such areas. In some regions, excrement is deposited in tanks which are from time to time removed by helicopter so that their contents may be treated at more conventional purification plants. There are also commercially available a number of composting toilets. Such toilets do address the water supply and ground and water contamination problems associated with flush toilets, and they are sometimes suitable alternatives for sewer or septic systems. However, the use of such commercially available composting toilets has brought with it its own problems. It is desirable that the decomposition processes used in such toilets be aerobic in nature (as opposed to anaerobic), but that is a goal more easily stated than actually obtained. Frequently, the decomposition processes are or become anaerobic in nature and produce thereby foul stenches, the possibility of a public health hazard from the spread of disease by pathogens that survive longer in an anaerobic decomposition process and environment and soil contamination from the leakage of an ammonia by-product. Some toilets, ostensibly aerobic, are only aerobic at or near the surface of the decomposing bio-mass. In addition, such systems typically do not work well (or at all) in cool or humid environments. In all cases, when anaerobic conditions occur a buildup of an excessive amount of liquid due to the inability of the system to effect its evaporation is observed. To meet this problem, electrical heat is sometimes provided, but its benefits are also often lost to cooler ambient air. As a result, in cool or cold temperatures biological activity slows or halts and instead of composting, in which input is reduced to approximately 5 to 10% of its original volume, one has a holding tank with little or no volume reduction. The contents of such tanks must, of course, be removed and further treated before they can safely be disposed of or returned to the earth.

In dry or warm climates the bio-mass will dry out too fast in the processing by available systems (including those using electric heat). This situation, although not as objectionable as anaerobic conditions, results in a bio-mass that has not been stabilized through the biochemical and digestive part of the composting process. This results in an end product that has additional biological activity when rewetted and will provide a breeding ground for disease vectors and, if left wet, will further decompose anaerobically, creating objectionable odors.

In general, energy introduced into the presently available composting toilets is generally uncontrolled and is frequently lost to the surroundings without performing the useful function of evaporation of excess liquid. In some instances, too uncontrolled energy is allowed through the bio-mass, rendering it dry and unstabilized.

The existing designs do not satisfactorily address the necessity for control of temperature, bio-mass moisture content, aeration, the carbon-to-nitrogen ratio and pH, nor do they allow for variable environmental conditions.

SUMMARY OF INVENTION

It is a principal object of the instant invention to provide an organic waste treatment system that is an aesthetic, economical and effective alternative to the flush toilet, and that also eliminates the problems associated with previous composting toilets by control of all relevant process variables.

It is also an object of this invention to provide controlled solar heating as a relevant and integral component of the aerobic composting process so as (a) to promote and sustain biological decomposition and humus stabilization automatically at its optimal level in all ambient air conditions and (b) to enhance moisture control and evaporation.

It is a further object of this invention to provide a sanitary system that works in harmony with the fragile ecology of wilderness and similar areas where access is difficult and water supply is often not to be found, so that hikers, campers, sportsmen, tourists, and the like may be served without the necessity of establishing plumbing, sewer, or electrical lines or of providing for the helicopter pickup of excrement containers.

It is yet another object of this invention to provide a toilet system that provides for biological decomposition of organic materials through an effective aerobic process that is odor free and results in an end product that can be returned to the earth without fear of biological or chemical contamination.

It is still another purpose of the present invention to provide a toilet system that produces a useful fertilizer and soil conditioning product.

It is a further object of this invention to provide an organic resource transformation system that will maintain an optimal aerobic biochemical process to rapidly convert what are considered wastes into useful resources.

It is still another object of this invention to control more efficiently the energy or driving force available to effect excess liquid evaporation while preventing overdrying.

It is yet another object of this invention to eliminate the relatively high costs of water-borne waste treatment systems.

The invention results from the realization that solar energy may be collected, stored, and delivered from storage in such a controlled way that the natural aerobic biological decomposition activity of microorganisms might be prompted and enhanced in the process of composting human excrement and other organic materials. The invention may be accomplished by using solar generated heat to promote an optimal biological environment, to minimize the circulation of cold air through the bio-mass and to provide for the evaporation of excess moisture.

The invention also embodies the realization that energy, heat or a partial pressure driving force is necessary to evaporate the liquid in excess or that required to optimally maintain a moist decomposing bio-mass and that such energy, heat or driving force can come from many different sources operating independently or in combination. These include, but are not limited to: warm dry air, electric resistance heating, nuclear energy, bio-mass biological activity and solar energy.

Additionally, the invention embodies the realization that such energy must be introduced to the bio-mass in such a way that the bio-mass is not overheated or dried out nor is it wasted by the inability of the system to present the liquid at the mass transfer surfaces. It is also important that thermal energy once captured and available for liquid evaporation not be easily lost to the surroundings.

None of the known prior art methods or devices has incorporated the combination of features and objectives as they are outlined in this summary of the invention. Further features and objects of the invention will be apparent from an examination of the accompanying drawings which illustrate the invention.

DESCRIPTION OF THE PREFERRED EMBODIMENT

A human being produces about 2.5 pounds of human excrement per day, two pounds being urine and half a pound feces. The largest single component of human excrement is water, which comprises approximately 75% of the feces and 94% of the urine. Since urine contains about ¼ the quantity of solids by weight that feces contain, and since there is about 4 times as much of it by weight per day, urine contributes about the same quantity of dry weight to human excrement as do feces. Each contributes about ⅛ of a pound per day per human being, making a total of ¼ pound dry weight of excrement produced per person per day. About 80% of the dry weight of feces is made up of organic compounds, consisting principally of carbon, nitrogen, calcium, phosphorous, and potassium. By removing moisture, human excrement can be reduced by 90% of its weight. In efficient aerobic composting systems, microbial metabolic activity reduces the remaining 10% by one-half, principally by releasing significant amounts of carbon, oxygen and nitrogen. Aerobic decomposition is preferable to anaerobic decomposition in compost toilet systems because it proceeds at a much faster rate, because it does not produce the foul-smelling gases given off by anaerobic decomposition, and because many pathogens are killed by the heat generated in aerobic decomposition.

Aerobic decomposition and the rate of aerobic decomposition are controlled by physical, chemical and nutritional factors. The principal physical factors are temperature, moisture content, and the degree of mixing in the composting mass. The principal chemical factors are oxygen availability and pH level. The principal nutritional factors relate to the availability and concentration of carbon, nitrogen and trace elements.

The composting process represents the integrated activity of a number of different kinds of microbes. Each kind thrives at a different temperature. Thus, temperature is never simultaneously at an optimum for all microbes at once. Nevertheless, the optimum temperature for the process as a whole is an integration of, or a compromise between, the temperature optima at the relevant portions of the bio-mass of the various microbes involved at any given time. The speed of the process as a whole is a function of this temperature. Experience indicates that the relevant microbes are most active between 35° and 55° C. and tend to be killed at temperatures above 71° C. Thus, it is desirable to maintain the bio-mass at a temperature between 35° and 55° C. If the object is to evaporate liquids, a temperature of 35° C. is usually ideal. Without electrical heating assistance, prior composting toilets typically operate at temperatures somewhat below these optima, usually between 22° and 32° C.

Moisture in an appropriate amount is also essential for aerobic action. Too much moisture, however, if it fills to capacity the interstices between the particles of the bio-mass, will limit the oxygen supply available to microbes and turn the process anaerobic.

Likewise, the more the bio-mass settles or is mixed or compressed, the smaller the interstitial volume becomes and the more limited the oxygen supply for the microbes.

Aerobic decomposition requires oxygen. In fact, the microbes that keep the process going require free oxygen where they are located, whether that be on the surface or on the interior of the pile, which means that one must not only provide oxygen to the pile in general, but also to the various portions of the pile. For optimum aerobic composting, oxygen availability must increase as temperature increases, other factors being equal.

The optimal pH level for relevant microbial activity is approximately 6.0–7.5. Human excrement is normally neither excessively acid nor alkaline, and thus tends to be in the general range of neutral pH. However, should an imbalance occur this invention can detect such change and effect appropriate response.

The bio-mass or pile is a nutrient medium for the composting microbes. The size of the molecules in the bio-mass, the complexity of their structure, and their elemental composition are important factors in the successive stages involved in the process of aerobic decomposition. Microbial activity requires carbon and nitrogen as essential nutrients. If the carbon to nitrogen (C/N) ratio is too great, biological activity diminishes, thereby extending the time required to complete the composting process. If the C/N ratio is too low, ammonia will be formed in amounts sufficient to be toxic to the microbial population, thereby terminating the biological decomposition process. Results of the cumulative experience of researchers in composting over the last 20 years head to the conclusion that a C/N ratio of about 25 or 30 parts of carbon to one part of nitrogen is optimum for most types of wastes. Since human excrement usually has a C/N ratio of about ten to one, it is advisable to add garbage scraps from the kitchen to the bio-mass in order to raise the percentage of available carbon in the pile. It is also sometimes desirable, though not essential, to add small amounts of available carbon-rich material such as peat moss or sawdust.

Thus, the physical, chemical and nutritional factors are interrelated: oxygen availability depends to some extent on moisture content; moisture content depends on temperature; the ability of the relevant microbes to attack the available carbon and nitrogen compounds depends on temperature and moisture content, and so on.

The present invention is directed towards providing the optimum environment for the efficient and effective aerobic decomposition of human excrement and other relevant organic materials by integrating into one system a composting system with temperature and moisture control capabilities made possible through the capture, retention, and subsequent availability of solar energy.

Reference to the drawings shows a composting chamber 10 enclosed in and/or under a housing enclosure 12 containing side walls 14, 16, front wall 18, rear wall 20, and roof 22. Entrance to the housing enclosure 12 is through a door 24 on its front wall 18. If the composting chamber lies either partially or wholly above ground, then access to the housing enclosure 12 will be by means of stairs 15. The composting chamber 10 contains a bio-mass or pile composting human excrement 28. The housing enclosure 12 contains a toilet bowl 30, connected to which is a seat 32 and a lid 34 which when closed over the toilet bowl 30 provide an air-tight seal for the toilet bowl 30. The toilet bowl 30 opens into composting chamber 10. Also connected with composting chamber 10 is a ventilation stack 36, which may include at its top 38 a draft inducer 40. Insect screening 42 should be provided in the ventilation stack 36.

Figure 1:
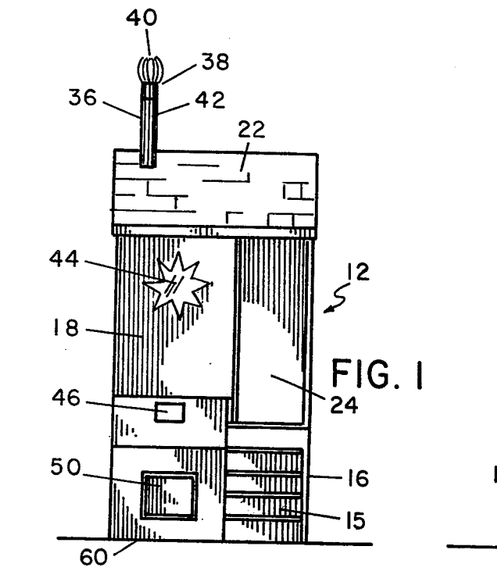
FIG. 1 is a plan view of the front wall of the system of the present invention.
Figure 3:
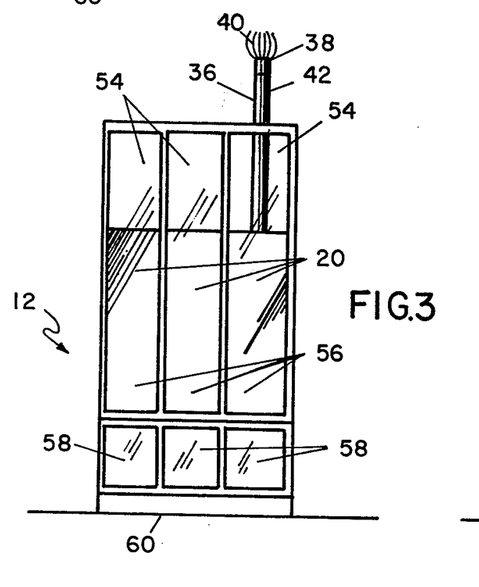
FIG. 3 is a plan view of the rear wall of the system of the present invention.
Figure 4:
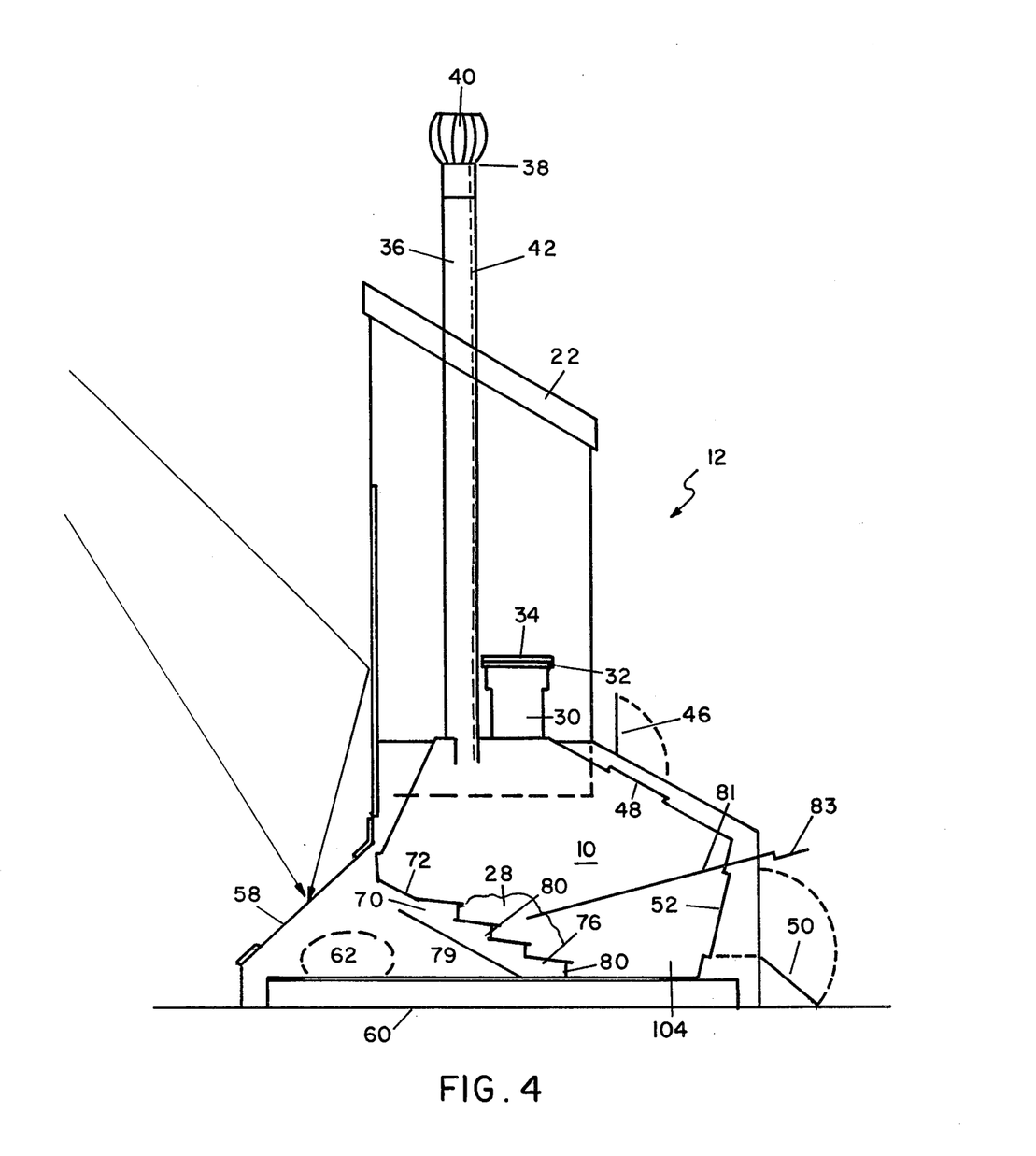
FIG. 4 is a cut away view of the interior of the system of the present invention.
Figure 5:
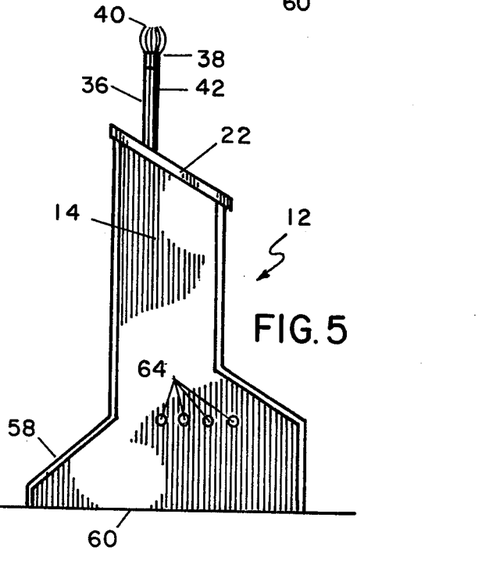
FIG. 5 is a plan view of another side wall of the system of the present invention.

The front wall 18 of the housing enclosure 12 contains a door 24, itself preferably containing a light-admitting opening 44, which may assume a variety of shapes and is covered with plexiglass or other similar material. The front wall 18 also contains a door 46, the opening of which will allow an observer to examine the amount and height of the bio-mass 28 in composting chamber 10 through a viewing port 48 provided in said tank 10. Also included in the front wall 18 is another door 50 which, when open, provides access to yet another door 52 in composing tank 10 so that the humus or compost produced by the aerobic biological degradation of human excrement may conveniently be removed from the composting chamber 10 from time to time. The rear wall 20 of the housing enclosure 12 contains at its uppermost portion translucent glazing material 54 which provides both illumination and heat for the interior of housing enclosure 12. Below transparent glazing 54, rear wall 18 is composed of plywood boards with reflective mirrors attached to their outermost side so as to provide at once a privacy screen for users of housing enclosure 12 and solar reflectors 56 for reflecting a portion of the solar radiation incident on said reflectors 56 to a solar glazing 58, which may be of any one of a variety of shapes, and which is mounted toward the base of rear wall 20 and typically is disposed at an angle to the more or less horizontal base 60 of said housing enclosure 12. The solar glazing 58, which may be any one of a large number of now or future commercially available solar glazings, directs solar energy to a thermal mass 62 disposed obliquely (in this embodiment) beneath it and supported by base 60. The thermal mass 62 can be composed of locally available rock, preferably painted black, of sand, of eutectic salts, of water or other appropriate fluids contained in cans, and indeed of any number of other possible substances. Its capacity will vary physically as a function of the temperature and humidity of the external environment, the average amount of sunlight to be expected in a given location, and the quantity and quality of the bio-mass itself. The roof 22 of housing enclosure 12 may be made of any suitable substance, such as corrugated metal, or preferably, so as to provide illumination and heat, of a translucent glazing material.

Figure 2:
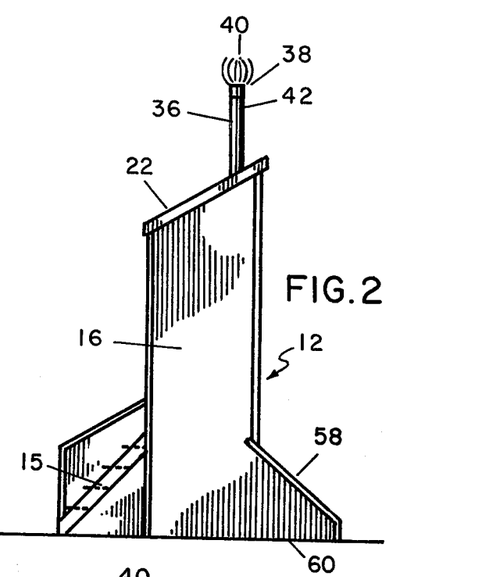
FIG. 2 is a plan view of one side wall of the system of the present invention.

Air intake ports 64 are provided in one of the walls of housing enclosure 12 and are illustrated here for convenience as being contained in side wall 14. The quantity of air admitted to the system through the air intake ports 64 may be controlled by a temperature or humidity controlled damper system 68 or 69. Said control would itself depend on the temperature and/or humidity at the relevant time in the ambient air or in thermal mass 62 or in both so that the quantity of air forwarded to the vicinity of thermal mass 62 can be controlled at any time for whatever are deemed to be the relevent temperature or humidity considerations affecting the bio-mass 28. The quality of the air admitted to the vicinity of thermal mass 62 from the air intake ports 64 can also be controlled, for example, for humidity, by providing that a damper system 69 be responsive to moisture sensing probes or sensors contained in one or more of the air intake ports 64, the composting chamber 10, or the vent stack 38. pH detectors 71 are positioned at various levels in the bio-mass 28 and are connected to indicators which monitor (and automatically control if necessary) the said alkalinity of the bio-mass 28.

The warm air to be found in the vicinity of thermal mass 62 is ducted either directly or by any suitable means, such as cylindrical tubes (not illustrated), to a distribution area 70 located in the lower portion of composting chamber 10. A portion 72 of the lower perimeter of composting chamber 10 has a step-like structure 76, then access by the air heated by thermal mass 62 to composting tank 10 is preferably through entry ports 97 located in the risers 80 of step-like structure 76. It will be clear, however, to those skilled in the art, that efficient ducting of air warmed by thermal mass 62 to composting tank 10 may be accomplished in a large number of ways.

Figure 6:
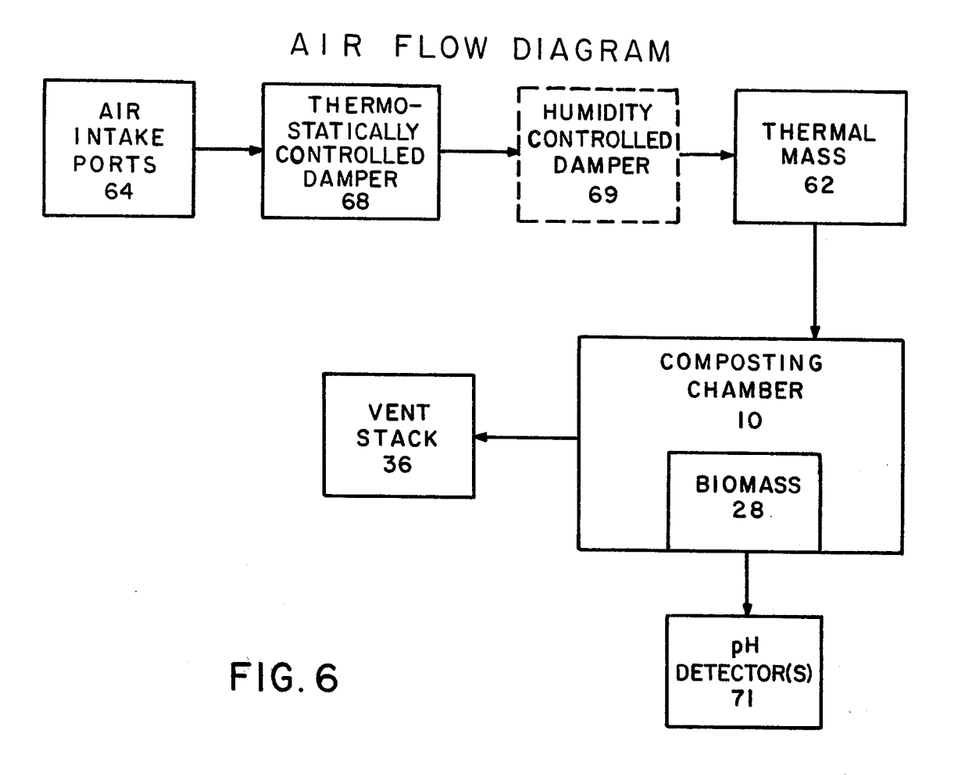
FIG. 6 is an air flow diagram illustrative of the processes of the present invention.

Ambient air from air intake ports 64, as warmed by thermal mass 62, is ducted into and through composting tank 10 via distribution area 70 and entry ports 97 and from there rises through vent stack 36 with the assistance of the pressure gradient created by the varying temperatures and also by draft inducer 40. To increase convection efficiency, the vent stack 36 is painted black and enclosed in solar glazing. This last procedure increases the stack gas temperature causing a higher rate of air flow through bio-mass 28, thereby at once providing for a better aerobic enviroment and for more effective venting of the gases and vapors produced in the aerobic decomposition process. To the same end, vent stack 36 may also be insulated in any one of a large number of conventionally known ways. Such insulating procedures also inhibit the condensation of water vapor on the inner surface of vent stack 36, thereby acting as moisture controls by preventing previously vaporized water from being returned in condensed form to bio-mass 28. In this instance, as well as others, the stack 36 is fitted with a stack condensation drip separator to prevent return of once evaporated water to the bio-mass. The draft inducer 40 may be driven, in one embodiment, by the wind, or by a motor energized by solar powered photovoltaic cells or integrated circuits in other embodiments. In other instances, where it is desirable to return the vent gases to the composting chamber 10 to improve the system efficiency, a suitable filter, which removes the harmful or odiferous gases, can be installed on or in the vent stack 36. This last arrangement makes possible the use of such filtered air for warming purposes within the enclosure 12 itself or within a communicating living space where, for example, the integrated solar heated resource transportation system of the present invention may be one portion of a larger structure instead of a detached unit.

In the preferred embodiment, the walls 14, 16, and 18 of housing enclosure 12 are made of exterior grade texture 1-11 plywood backed by insulating materials 17 and vapor barriers. The type and quantity of translucent glazing material 54 located at the uppermost portion of rear wall 20 and in roof 22 (should any glazing be used there) can easily be selected by those skilled in the art in combination with suitable insulating materials 17 and vapor barriers so as to produce a comfortable environment within housing enclosure 12 whatever the exterior environment. It is also advisable to insulate composting chamber 10 so that the heat produced in it, either by the composting pile 28 itself or from the warmed air ducted into it as explained above, will not be lost to cooler outside ambient air. For the same reason, base 60 should also be insulated.

Composting chamber 10 is waterproof so as to contain liquids until they have been evaported or otherwise removed. It should also be screened wherever there is air access so as to control insects. In one embodiment it may include a mixing device 81 to allow for turning bio-mass 28 or for folding the outside portion of such bio-mass 28 into the inner portion to promote aerobic decomposition. Such mixing device 81 is auger-shaped and is manually turned by a connected crank 83 in front wall 18 of housing enclosure 12. It is also possible that such mixing device 81 be driven by an electric motor energized by solar powered photovoltaic cells or integrated circuits or a solar heat motion generation device, since such turning can be made as the solar energy is available. Other shapes, of course, are possible, such as a drum or sphere that may be turned instead of the auger not unlike a gem tumbler or cement mixer.

In an even simpler embodiment, direct access to the pile 28 for manual turning by shovel may be provided through door 52 in composting tank or through viewing port 48, if it is large enough and fitted with a door or removable window.

Figure 8:
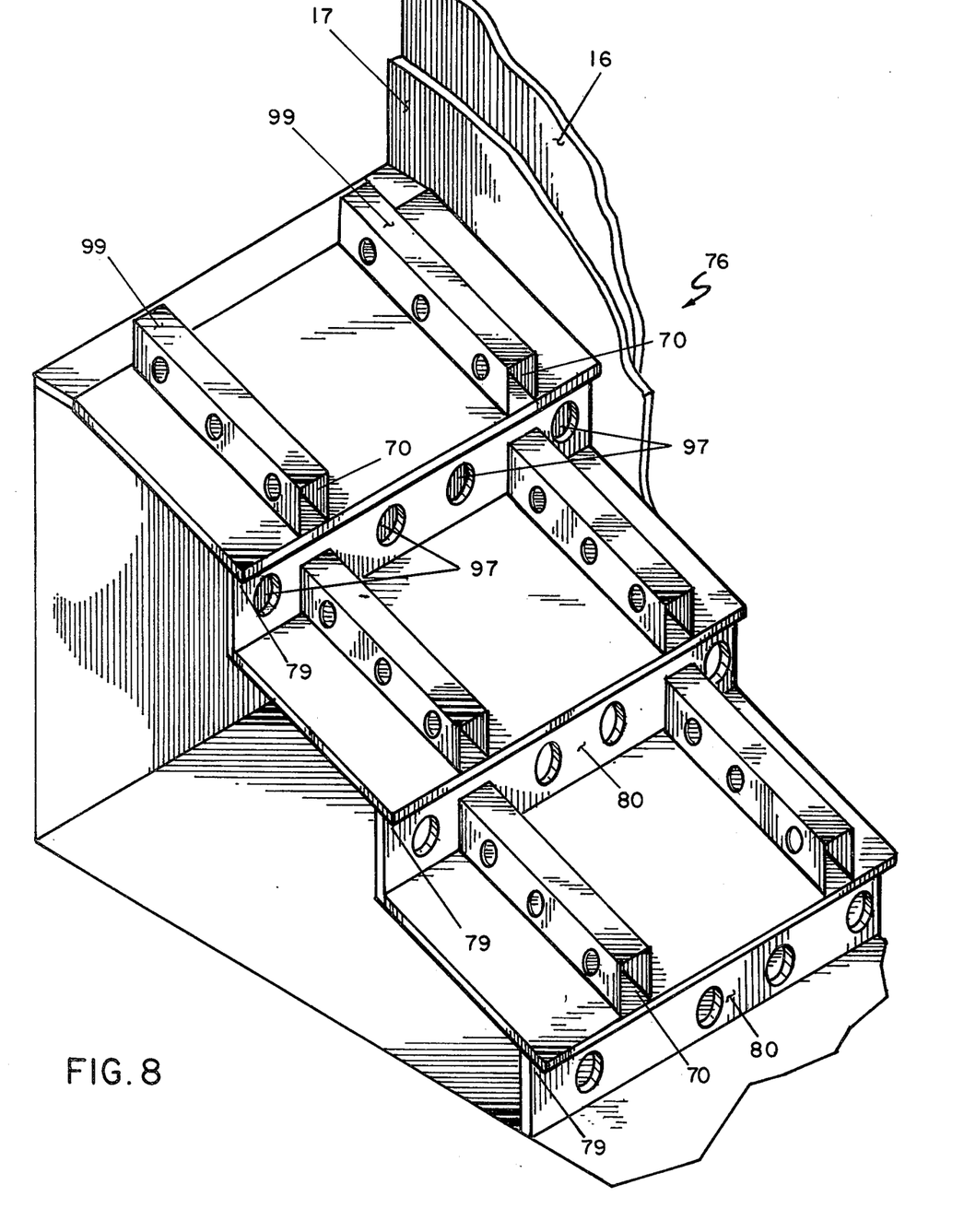
FIG. 8 is a cut away view of one embodiment of the interior of the composting chamber of the present invention.

Composting chamber 10 may assume a variety of shapes. In the preferred embodiment, a portion 72 of its lower perimeter is generally inclined or sloped so that bio-mass 28 as it undergoes aerobic decomposition will gradually slide from the higher part of such incline when initially deposited to the lower part when fully composted. Said generally inclined portion 72 of the lower perimeter of composting tank 10 also has a step-like structure such that the stringers 79 of each tread extend beyond the risers 80 so as to provide a protected area for air to enter composting chamber 10 through entry ports 97 for the promotion of aerobic decomposition. A stationary pile arrangement, however, is also possible, although in such arrangement it is more important that means be provided for turning bio-mass 28 or for folding the outside portion of such bio-mass 28 into its inner portion to promote aerobic decomposition. Other shapes, too, may be used for the composting chamber 10.

It is also useful to provide a plurality of spaced apart dividers 99 that run lengthwise through the composting tank 10 (for example, from top to bottom of inclined portion 72) so as to separate the composting bio-mass 28 into a plurality of sub-piles, thereby promoting more aeration through the bio-mass 28 and consequently promoting aerobic decomposition. In the preferred embodiment, such dividers are inverted U-shaped structures which contain entry ports communicating with distribution area 70 and that allow yet additional air to be drawn into composting tank 10 and through bio-mass 28.

Figure 7:
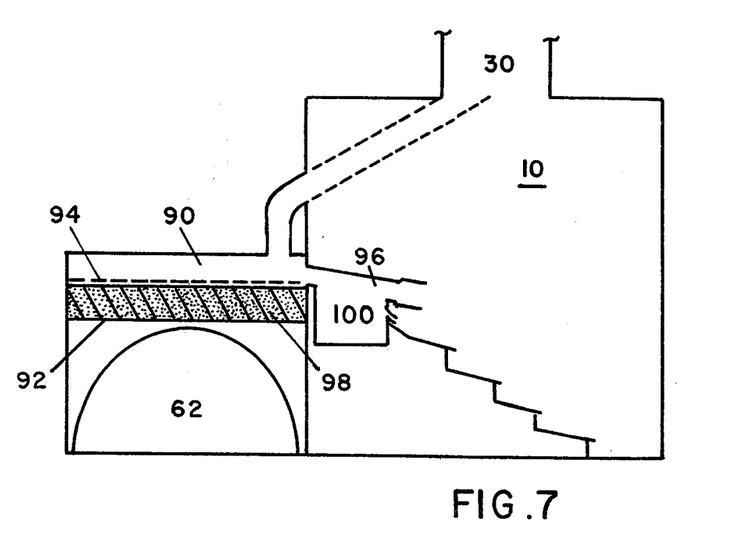
FIG. 7 is a cut away view of one embodiment of the liquid shunting process of the present invention.

The preferred embodiment of the present invention also features a separation tray 90 which allows for the shunting of urine in excess of that required to provide proper moisture to sustain aerobic decomposition to an evaporation device 92. The separation tray 90 may be any one of a number of possible designs. In a preferred embodiment, separation tray 90 is covered with a cellulose mat 94 which absorbs a portion of the urine that falls on it and allows the excess to overflow into either an evaporation device 92 or a redistributive device 96. Mats of different absorptivity may of course be used for different applications.

The evaporation device 92 is a simple pan or dish, or can be an open organic mesh presenting a large mass transfer surface area such as a depth of small twigs 98, over which the urine can flow and evaporate. Since there will be solids left behind when urine evaporates, it is essential that evaporation device 92 be accessible for cleaning and for the removal of accumulated solids. If small twigs 98 were used, they would simply have to be dumped with the accumulated solids into the composting bio-mass 28 for further stabilization. It is also important that the urine be fed to the evaporation device 92 in proportion to the ability of the ambient air to effect its evaporation. Since the bio-mass 28 itself presents a large surface area for evaporation, proper distribution of excess urine is an alternative to the evaporation device 92. It is also possible to redirect liquid that remains in the bottom of many of the existing compost systems and which creates anaerobic conditions. Such liquid can be diverted to either the evaporation device 92 or to the redistribution device 96. Redistribution device 96 collects urine and redistributes it slowly and more evenly over the bio-mass 28 to improve the evaporation efficiency of the system. Such a redistribution device 96 consists of a storage tray or tank 100 that accepts urine at the human output rate and discharges it at a slower rate to a distribution device 96. Discharge may also be controlled by the ability of the air used for ventilation in the system to effect its evaporation.

Thus the present invention includes within a single system means for the solar augmentation of aerobic organic decomposition. The system requires neither water or other plumbing lines. Solar energy is used to increase the normal temperature in the composting bio-mass, and because such temperature is usually below the most desirable temperature for optimal microbial activity, solar energy is used to enhance such activity. Solar energy is also used to evaporate excess liquid, thereby also promoting optimal microbial activity. Since the process provided for is truly aerobic, no foul odors are produced. Since the process is maintained at levels above the death point of pathogenic microbes, public health problems are eliminated. And the end product, free of pathogens, is useful as a soil nutrient or fertilizer.

A solar sterilization process is also conceived whereby solar energy, is used to produce UV radiation or high temperature heat to pasteurize or sterilize the stabilized humus-like end product.

Finally, it should be noted that a system such as the one disclosed herein may be used not only for the aerobic decomposition of human excrement but also for the aerobic composting of farm and garden products, and indeed of most organic materials. In addition, such a system may contain more than one toilet bowl 30 and more than one composting chamber 10. The distance between the toilet bowl and the composting chamber may be quite extensive, as where a toilet bowl 30 located on the top floor of a large apartment complex communicates, with the assistance of a vacuum transport device if necessary, with a composting chamber 10 located in the basement of such apartment building.

In addition, the humus collected in area 104 may be treated directly to effect pasteurization or sterilization or the like by means of solar derived energy (e.g., glazing may be placed in a portion of side walls 14, 16 in the vicinity of area 104.

A preferred embodiment of this invention has been set forth in the description and drawings. These descriptions and drawings are used in the generic sense only and not for purposes of limitation. Various design and structural changes may be made in the components and system described without departing from the invention.

Other embodiments will occur to those skilled in the art and are within the following claims:

What is claimed is:

1. An organic waste treatment system for the production of humus or compost providing for the controlled aerobic composting of organic materials, comprising in combination:
   at least one composting chamber;
   at least one thermal mass;
   means for conveying air from the vicinity of at least one said thermal mass to at least one said composting chamber;
   means for providing solar-derived heat to at least one said thermal mass;
   at least one air intake port for providing air in the vicinity of at least one said thermal mass; and
   ventilation means communicating with at least one said composting chamber.

2. The organic waste treatment system as claimed in claim 1 wherein at least one said composting chamber contains spaced apart longitudinal dividers with air entry ports.

3. The organic waste treatment system as claimed in claim 1 wherein at least one said composting chamber has a portion of its lower perimeter generally inclined with respect to the horizontal.

4. The organic waste treatment system as claimed in claim 1 wherein at least one said composting chamber has a steplike structure in a portion of its lower perimeter.

5. The organic waste treatment system as claimed in claim 1 further including at least one damper system to control the air flow within said composting chamber.

6. The organic waste treatment system as claimed in claim 5 further including a thermostat responsive to the temperature within at least one said composting chamber for controlling at least one said damper system to regulate the temperature of said air flow within said composting chamber.

7. The organic waste treatment system as claimed in claim 1 further including a pH indicator for monitoring the pH level of a bio-mass in at least one of said composting chambers.

8. The organic waste treatment system as claimed in claim 1 further including a housing enclosure.

9. The organic waste treatment system as claimed in claim 1 wherein at least one said composting chamber is insulated.

10. The organic waste treatment system as claimed in claim 1 further including at least one toilet bowl communicating with at least one said composting chamber.

11. The organic waste treatment system as claimed in claim 1 further including a mixing device communicating with at least one said composting chamber and operable from outside said composting chamber.

12. The organic waste treatment system as claimed in claim 10 further comprising means for shunting liquids from said toilet bowl to at least one said composting chamber.

13. The organic waste treatment system as claimed in claim 1 further including a thermostat responsive to the temperature within at least one said ventilation means for controlling a damper system to regulate the temperature within said ventilation means.

14. The organic waste treatment system as claimed in claim 1 further including a humidistat responsive to the humidity within at least one said ventilation means for controlling a damper system to regulate the humidity within said ventilation means.

15. The organic waste treatment system as claimed in claim 1 wherein said ventilation means contains a draft inducer.

16. The organic waste treatment system as claimed in claim 1 wherein said ventilation means is at least partially covered with solar glazing.

17. The organic waste treatment system as claimed in claim 1 wherein said ventilation means is insulated.

18. The organic waste treatment system as claimed in claim 1 wherein said ventilation means contains means for removing undesirable odors and gases from the air passing through said ventilation stack.

19. The organic waste treatment system as claimed in claim 8 wherein said housing enclosure includes reflecting mirrors to concentrate incident sunlight on said means for providing solar-derived heat to at least one said thermal mass.

20. The organic waste treatment system as claimed in claim 8 wherein said housing enclosure includes translucent solar glazing for providing heat and illumination to said housing enclosure.

21. The organic waste treatment system as claimed in claim 12 wherein said shunting means contain an absorbing cellulose mat.

22. The organic waste treatment system as claimed in claim 15 wherein the means for operating said draft inducer is electrically powered.

23. An organic waste treatment system for the production of humus or compost providing for the controlled aerobic composting of organic material, comprising in combination:
- at least one composting chamber;
- at least one thermal mass;
- means for conveying air from the vicinity of at least one said thermal mass to at least one said composting chamber;
- at least one solar glazing panel for providing heat to at least one said thermal mass;
- at least one air intake port for providing air in the vicinity of at least one said thermal mass;
- at least one ventilation stack communicating with at least one said composting chamber;
- at least one toilet bowl communicating with at least one said composting chamber;
- means for controlling the temperature of the air within at least one said composting chamber and at least one said ventilation stack; and
- means for controlling the humidity of the air within at least one said composting chamber and at least one said ventilation stack.

* * * * *